United States Patent [19]
Jackson

[11] 4,157,740
[45] Jun. 12, 1979

[54] REMOTE SHIFT CONTROL FOR A TILT CAB TRUCK

[75] Inventor: Mark H. Jackson, Dearborn Heights, Mich.

[73] Assignee: Ford Motor Company, Dearborn, Mich.

[21] Appl. No.: 833,220

[22] Filed: Sep. 14, 1977

[51] Int. Cl.² ............................................. B60K 20/04
[52] U.S. Cl. .............................. 180/77 TC; 74/473 R; 180/90.6
[58] Field of Search ......................... 180/77 TC, 89.14; 74/473 R; 180/90.6

[56] References Cited

U.S. PATENT DOCUMENTS 3,329,229  7/1967  Mukho ............................ 180/77 TC
3,732,746  5/1973  Fitzpatrick ........................ 74/473 R

FOREIGN PATENT DOCUMENTS 2338659  2/1975  Fed. Rep. of Germany ........ 180/89.14

Primary Examiner—Joseph F. Peters, Jr.
Assistant Examiner—Donn McGiehan
Attorney, Agent, or Firm—Donald J. Harrington; Keith L. Zerschling

[57] ABSTRACT

A gearshift mechanism for a manually controlled transmission adapted for use with a tilt cab truck wherein provision is made for mounting the gearshift mechanism to permit a free floating action thereby obtaining compliance with the motion of the cab relative to the truck frame and chassis.

5 Claims, 8 Drawing Figures

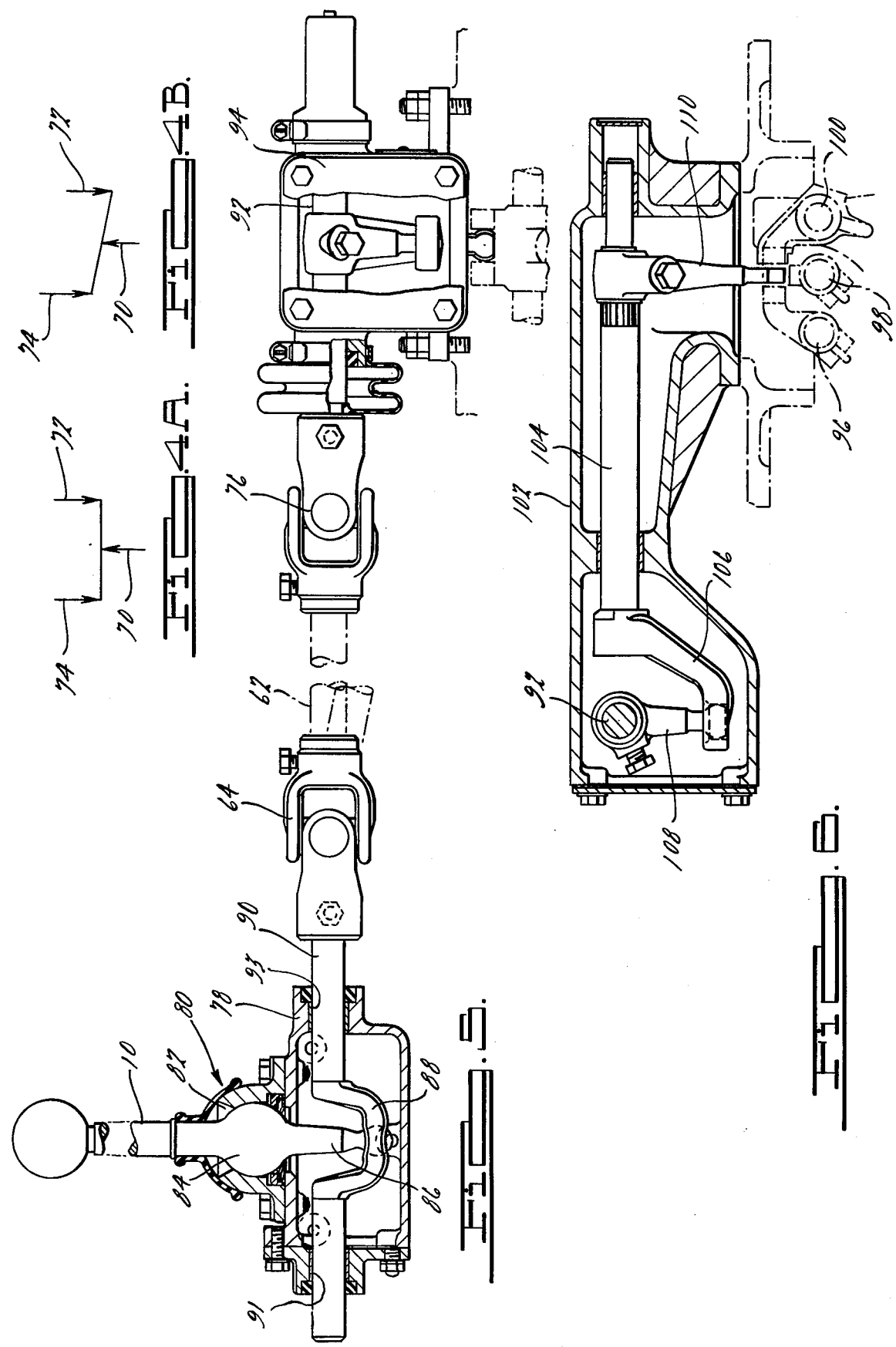

2

REMOTE SHIFT CONTROL FOR A TILT CAB TRUCK

GENERAL DESCRIPTION OF THE INVENTION

My invention is adapted especially to be used with a so-called tilt cab truck wherein the cab of the truck is hinged at the forward end of the truck frame and adapted to pivot about the axis of the hinge to permit access to the engine and transmission for the truck. The vehicle operator in the cab is located above the engine and transmission assembly.

Gearshift mechanisms for tilt cab trucks normally include a shift lever that extends through the floor of the cab and into the cab interior adjacent the operator's chair or bench. If the cab is mounted for floating movement to accommodate pitching movement in a fore-and-aft direction or for rolling movement in a transverse direction and/or for vertical movement or jounce, the driver and the cab will be displaced relative to the gearshift lever, thereby making it difficult if not impossible under certain rough road conditions to control the gearshifting sequence of the truck transmission. The improved gearshift mechanism of my invention makes it possible for the gearshift linkage to comply with the motion of the cab in either a forward or rearward direction during pitching of the cab or in a lateral direction when the cab rolls as well as during vertical jounce.

I am aware of several prior art tilt cab gearshift lever constructions. Examples are shown in U.S. Pat. Nos. 3,476,202; 3,392,597; 2,694,943; 3,926,068 and 3,329,229. In each of these constructions the gearshift lever is mounted for universal movement about a point that is fixed with respect to the vehicle frame or chassis. The universal movement is transmitted through a linkage mechanism to a multiple speed ratio transmission. There is no provision for allowing the gearshift mechanism to move so that a free floating effect is achieved permitting full compliance between the motion of the cab and the motion of the gearshift mechanism.

BRIEF DESCRIPTION OF THE FIGURES OF THE DRAWINGS

FIGS. 4(a) and 4(b) are vector diagrams showing the forces that are applied to the gearshift mechanism of FIGS. 1 and 2.

FIG. 5 is an assembly view showing a portion of the gearshift master control which forms a part of the structure of FIGS. 1 and 2.

FIG. 6 is a view of the gear selector mechanism that is mounted on the transmission for the truck. It is actuated by the mechanism of FIG. 5.

PARTICULAR DESCRIPTION OF THE INVENTION

Figure 1:
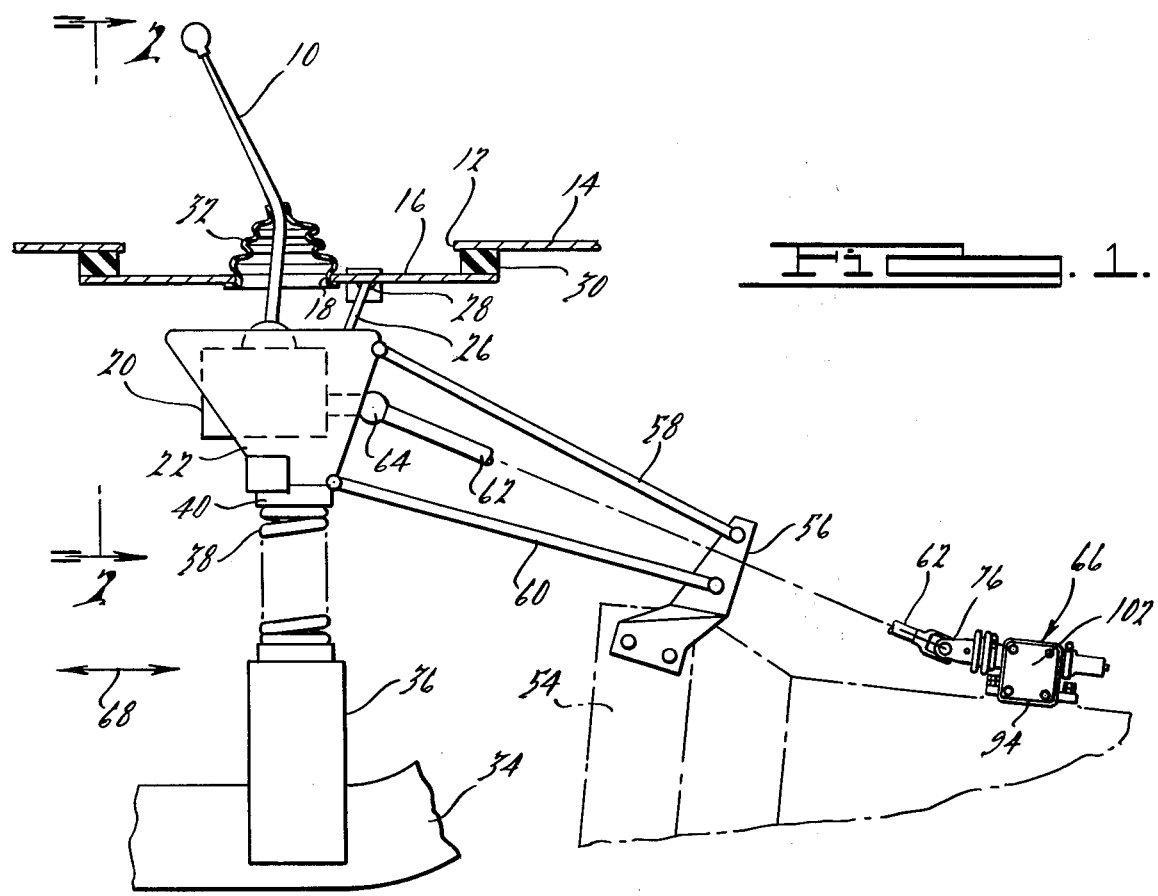
FIG. 1 is a schematic assembly view of a gearshift mechanism for a tilt cab truck embodying the features of my invention.
Figure 2:
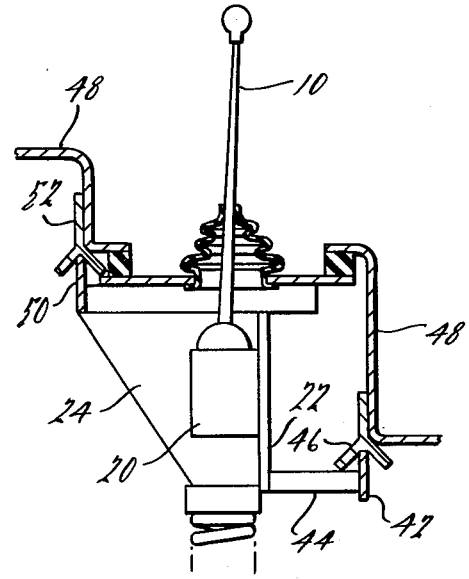
FIG. 2 is a front elevation view of the structure of FIG. 1 as seen from the plane of section line 2—2 of FIG. 1.

In FIG. 1 numeral 10 designates the gearshift lever that extends through an opening 12 in the floor 14 of the cab of a tilt cab truck. The opening 12 is covered by a cover plate 16 having an opening 18 through which the lever 10 extends.

Lever 10, which usually is referred to as a cane lever, is mounted for universal movement in a gearshift master control, 20 which will be described particularly with reference to FIG. 5. The control 20 is secured fast to a supporting wall 22 of a main gearshift support 24. An extension 26 of the support 24 is hinged at 28 to a cover plate 16. A resilient insulator 30, located between the cover plate 16 and the cab floor sheet metal 14, surrounds the opening 12. It may be secured either to the sheet metal 14 or to the cover plate 16. A rubber or leather boot 32 surrounds the opening 18 and the base of the cane lever 10.

The truck frame is shown at 34. The spring seat 36 is fixed to the frame 34 and a support spring 38 is carried by it. The upper end of the spring 38 is secured to the base 40 of the gearshift support 24.

A guide 42 is carried by an extension 44 of the support 24. It is in the form of a plate which is adapted to be received within guide member 46. It is secured fast to the cab floor sheet metal 48. A similar plate 50 is carried by the support 24 on the opposite side of the master shift control 20. One edge of the plate 50 is adapted to be received within the guide member 52. Both the guide member 52 and the guide member 46 have flanges that form a V-shaped groove that receives the margins of the plate 50 and the plate 42, respectively.

Figure 3A:
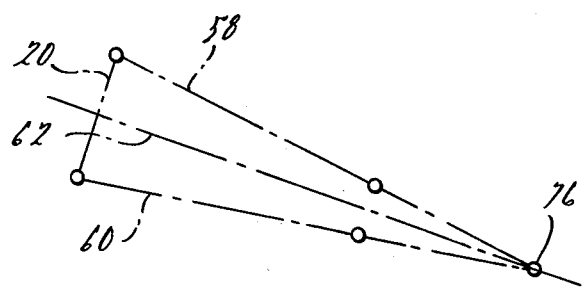
FIG. 3(a) and FIG. 3(b) are diagrammatic representations of the control arms for supporting the gearshift mechanism shown in FIGS. 1 and 2.
Figure 3B:
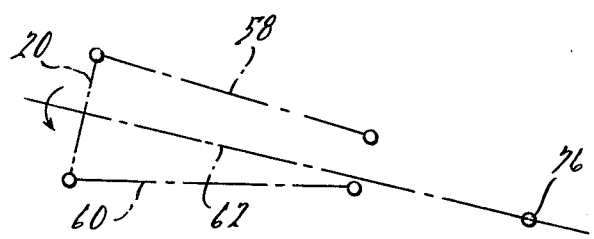

The engine flywheel housing 54 carries a bracket 56 to which is secured one end of a pair of control arms 58 and 60. The opposite ends of the control arms 58 and 60 are connected to the support 24. The control arms 58 and 60, the bracket 56 and the support 24 form a parallelogram linkage system as illustrated schematically in FIGS. 3(a) and 3(b). The support 24 is capable of moving generally vertically when the cab moves relative to the truck frame in a vertical direction. FIG. 3(a) illustrates the position of the linkage system when the cab moves upwardly relative to the frame. FIG. 3(b) shows a corresponding position when the cab moves downwardly relative to the frame.

Motion is transmitted from the output element of the gearshift master control to the control shaft 62, which is connected by means of a universal joint 64 to the gearshift master control. The opposite end of the control shaft 62 is connected to a gearshift selector mechanism 66 which will be described with reference to FIG. 6.

The cab sheet metal is adapted to move in a fore-and-aft direction as indicated by the directional arrows 68 by reason of the sliding action that is permitted between the guides 46 and 52 relative to guide plates 46 and 50, respectively. Rolling motion of the cab will cause a corresponding rocking of the member 24 and its associated gearshift master control. Compliance of the rocking action of the member 24 with respect to the rolling cab is permitted by the free-floating action of the spring 38.

In FIGS. 4(a) and 4(b) I have shown a diagram of the balanced forces that are applied to the member 24. The spring force acting on the member 24 is shown by vector 70 and the balancing forces applied by the guides 46 and 52 are shown, respectively, at 72 and 74. FIG. 4(a) shows the position of the force vectors during normal operation. FIG. 4(b) shows the corresponding position of the force vectors during rolling of the cab.

The gearshift master control rises and falls by reason of the action of the parallelogram support system shown schematically in FIGS. 3(a) and 3(b). The universal joint 76 for the gearshift selector mechanism in the corresponding universal joint 64 at the opposite end of the control shaft 62 permit operation of the selector mechanism 66 regardless of the full-floating motion of the support 24.

FIGS. 5 and 6 illustrate a preferred embodiment for the gearshift master control and the selector mechanism. It includes a support housing 78, which is bolted or otherwise secured to the wall 22 of the support 24. A universal ball-and-socket joint 80 supports the cane lever 10 on the housing 78. The connection 80 includes a socket member 82 and a cooperating ball 84, the latter being formed on the cane 10. The operating end 86 of the cane is secured to an offset portion 88 of a control shaft 90 which is slidably received in bushings formed in openings 91 and 93 for the housing 78.

The control shaft 90 is connected by means of universal joint 64 to the shaft 62. The opposite end of shaft 62 is connected by universal joint 76 to control shaft 92 which forms a part of the selector mechanism. The selector mechanism includes a mounting plate 94 which is secured to the top of the transmission and is adapted to be rotated about its axis or to be moved in left and right hand directions as viewed in FIG. 5.

When the cane lever 10 is moved in a fore-and-aft direction, linear motion of the shaft 90 is established and that motion is transferred through the universal joints and the shaft 62 to the control shaft 92. When the cane lever 10 is moved in a transverse direction, the offset connection between the extension 86 and the offset portion 88 causes the shaft 90 to rotate. This rotary motion is transferred through the universal joints in the shaft 62 to the control shaft 92.

FIG. 6 shows the connection between the control shaft 92 and the ratio selectors, the latter including the three shift rails 96, 98 and 100.

The selector mechanism includes a shift tower housing 102 within which is positioned a control shaft 104 adapted for sliding and rotary movements. The end of the shaft 104 carries an arm 106. A control arm 108 is connected to the end of the arm 106 with a universal connection. Shaft 92 carries arm 108 and moves with it. When the shaft 92 is rotated, linear sliding motion is transmitted to the shaft 104. When shaft 92 undergoes linear motion, rotary motion is transmitted through the arm 106 to the shaft 104.

Shaft 104 carries selector finger 110 which is adapted to engage one of the three shift rails 96, 98 and 100. The selection of one shift rail over the other occurs as the shaft 104 is moved linearly. When the shaft 104 is rotated, the selected shift rail 96, 98 or 100 will be shifted linearly.

Having thus described a preferred embodiment of my invention, what I claim and desire to secure by U.S. Letters patent is:

1. A transmission gear ratio changing mechanism adapted especially for use with a vehicle having a chassis for supporting a vehicle engine and transmission assembly and a cab mounted for tilting movement on said chassis, said gear ratio changing mechanism comprising a cane type shift lever, said cab having a floor with an opening therein through which said shift lever extends, a shift master control mechanism mounted resiliently on said chassis, the mounting means for said master control providing the resiliency and accomodating floating movement of said master control, said master control comprising a shift lever supporting bracket, a guide element secured to said bracket on a location spaced laterally with respect to the fore-and-aft axis of said vehicle, at least one guide member secured to the floor of said cab and engageable with said guide element on said bracket, said resilient mounting means transmitting to said bracket a vertical force which is counteracted by reaction forces transmitted to said bracket through said guide element and guide vehicle whereby said bracket complies with rolling motion of the cab with respect to said chassis, said guide element and said guide member being slideable relative to each other in a direction generally parallel to the axis of said vehicle to accommodate pitching motion of said cab relative to said chassis.

2. A gear ratio changing mechanism for a multiple ratio power transmission in a tilt cab vehicle, said vehicle comprising a vehicle frame and chassis assembly, said frame and chassis assembly supporting an engine and transmission assembly for said vehicle, a gearshift master control, a spring supporting said master control, a spring mounting element carried by said frame and chassis assembly for supporting said spring, control arms connecting said master control to said engine and transmission assembly whereby said master control is adapted to move vertically relative to said transmission and said frame and chassis assembly, gear ratio changing elements in said engine and transmission assembly connected operatively to said master control through a control shaft, said master control comprising a shift lever extending into said cab, said cab having a floor with an opening for receiving said shift lever and guide means including a first portion connected to said cab and a registering portion connected to said master control for positioning said master control and for transmitting thereto a reaction force that opposes an equal and opposite force transmitted to said master control by said spring whereby compliance of said master control relative to said cab is achieved during rolling motion of said cab and pitching motion thereof with respect to said frame and chassis assembly.

3. A transmission gear ratio changing mechanism adapted especially for use with a vehicle having a chassis for supporting a vehicle engine and transmission assembly and a cab mounted for tilting movement on said chassis, said gear ratio changing mechanism comprising a cane type shift lever, said cab having a floor with an opening therein through which said shift lever extends, a shift master control mechanism mounted resiliently on said chassis, the mounting means for said master control providing the resiliency and accomodating floating movement of said master control, said master control comprising a shift lever supporting bracket, a guide element secured to said bracket on a location spaced laterally with respect to the fore-and-aft axis of said vehicle, at least one guide member secured to the floor of said cab and engageable with said guide element on said bracket, said resilient mounting means transmitting to said bracket a vertical force which is counteracted by reaction forces transmitted to said bracket through said guide element and guide vehicle whereby said bracket complies with rolling motion of the cab with respect to said chassis, said guide element and said guide member being slideable relative to each other in a direction generally parallel to the axis of said vehicle to accommodate pitching motion of said cab relative to said chassis, said gearshift master control comprising a cover plate extending over the opening in said floor, said master control including also a support bracket to which said guide element is secured, and a hinged connection between said bracket and said cover plate, said cover plate having a central opening and said shift lever extending through said cover plate opening.

4. A gear ratio changing mechanism for a multiple ratio power transmission in a tilt cab vehicle, said vehicle comprising a vehicle frame and chassis assembly, said frame and chassis assembly supporting an engine and transmission assembly for said vehicle, a gearshift master control, a spring supporting said master control, a spring mounting element carried by said frame and chassis assembly for supporting said spring, control arms connecting said master control to said engine and transmission assembly whereby said master control is adapted to move vertically relative to said transmission and said frame and chassis assembly, gear ratio changing elements in said engine and transmission assembly connected operatively to said master control through a control shaft, said master control comprising a shift lever extending into said cab, said cab having a floor with an opening for receiving said shift lever and guide means including a first portion connected to said cab and a registering portion connected to said master control for positioning said master control and for transmitting thereto a reaction force that opposes an equal and opposite force transmitted to said master control by said spring whereby compliance of said master control relative to said cab is achieved during rolling motion of said cab and pitching motion thereof with respect to said frame and chassis assembly, said gearshift master control comprising a cover plate extending over the opening in said floor, said master control including also a support bracket to which one registering portion of said guide means is secured, and a hinged connection between said bracket and said cover plate, said cover plate having a central opening and said shift lever extending through said cover plate opening.

5. A gear ratio changing mechanism for a multiple ratio power transmission in a tilt cab vehicle, said vehicle comprising a vehicle frame and chassis assembly, said frame and chassis assembly supporting an engine and transmission assembly for said vehicle, a gearshift master control, a spring supporting said master control, a spring mounting element carried by said frame and chassis assembly for supporting said spring, control arms connecting said master control to said engine and transmission assembly whereby said master control is adapted to move vertically relative to said transmission and said frame and chassis assembly, gear ratio changing elements in said engine and transmission assembly connected operatively to said master control through a control shaft, said master control comprising a shift lever extending into said cab, said cab having a floor with an opening for receiving said shift lever and guide means including a first portion connected to said cab and a registering portion connected to said master control for positioning said master control and for transmitting thereto a reaction force that opposes an equal and opposite force transmitted to said master control by said spring whereby compliance of said master control relative to said cab is achieved during rolling motion of said cab and pitching motion thereof with respect to said frame and chassis assembly, ratio changing mechanisms including control arms forming a parallelogram linkage system, one end of each of said control arms being secured fast with respect to said engine and transmission assembly, the other end of each of said control arms being connected to said bracket, said bracket forming with the control arms three sides of said parallelogram linkage system.

* * * * *